(12) United States Patent
Lim et al.

(10) Patent No.: US 11,338,560 B2
(45) Date of Patent: May 24, 2022

(54) FUNCTIONAL FABRIC AND MANUFACTURING METHOD THEREFOR

(71) Applicant: SUKGYUNG AT CO., LTD., Ansan-si (KR)

(72) Inventors: Hyung Sup Lim, Ansan-si (KR); Young Cheol Yoo, Ansan-si (KR); O Sung Kwon, Gunpo-si (KR)

(73) Assignee: SUKGYUNG AT CO., LTD., Ansan-si (KR)

( * ) Notice: Subject to any disclaimer, the term of this patent is extended or adjusted under 35 U.S.C. 154(b) by 84 days.

(21) Appl. No.: 15/740,575

(22) PCT Filed: Jul. 23, 2015

(86) PCT No.: PCT/KR2015/007674
§ 371 (c)(1),
(2) Date: Dec. 28, 2017

(87) PCT Pub. No.: WO2017/003008
PCT Pub. Date: Jan. 5, 2017

(65) Prior Publication Data
US 2018/0194118 A1 Jul. 12, 2018

(30) Foreign Application Priority Data

Jul. 2, 2015 (KR) .................. 10-2015-0094613

(51) Int. Cl.
*B32B 27/12* (2006.01)
*B32B 27/40* (2006.01)
(Continued)

(52) U.S. Cl.
CPC .............. *B32B 27/12* (2013.01); *B32B 27/20* (2013.01); *B32B 27/24* (2013.01); *B32B 27/40* (2013.01);
(Continued)

(58) Field of Classification Search
CPC ...... A41D 31/06; A41D 31/065; B32B 27/12; B32B 27/20; B32B 27/40; B32B 27/24;
(Continued)

(56) References Cited

U.S. PATENT DOCUMENTS

| 4,555,448 A * | 11/1985 | Durham | .................. C08K 3/36 |
| | | | 428/402 |
| 2004/0132846 A1* | 7/2004 | Leventis | ............... C01B 33/145 |
| | | | 521/99 |

(Continued)

FOREIGN PATENT DOCUMENTS

| JP | 2000226778 | 8/2000 |
| JP | 2001303341 A | * 11/2000 |

(Continued)

OTHER PUBLICATIONS

International Search Report—PCT/KR2015/007674 dated Jun. 3, 2016.

*Primary Examiner* — Matthew D Matzek
(74) *Attorney, Agent, or Firm* — Cantor Colburn LLP (57) ABSTRACT

Provided is a functional fabric including a base fabric layer; and an insulation flexible sheet attached to at least one surface of the base fabric layer. The insulation flexible sheet includes a first flexible base; and an insulation coating layer attached to at least one surface of the base. The insulation flexible sheet may additionally include a second flexible base on the insulation coating layer. Accordingly, the functional fabric may have effective insulation properties by using silica particles having pores in a small amount used, and may have excellent strength due to the strength of the silica particles. In addition, Manufacturing methods of an insulation flexible sheet and a functional fabric are provided.

17 Claims, 4 Drawing Sheets

(51) Int. Cl.
*B32B 27/20* (2006.01)
*B32B 27/24* (2006.01)
*B32B 37/06* (2006.01)
*B32B 37/24* (2006.01)
*B32B 27/26* (2006.01)

(52) U.S. Cl.
CPC .............. *B32B 37/06* (2013.01); *B32B 27/26* (2013.01); *B32B 37/24* (2013.01); *B32B 2255/10* (2013.01); *B32B 2262/00* (2013.01); *B32B 2262/0276* (2013.01); *B32B 2264/102* (2013.01); *B32B 2307/304* (2013.01); *B32B 2307/546* (2013.01); *B32B 2309/02* (2013.01); *B32B 2309/105* (2013.01); *B32B 2437/00* (2013.01)

(58) Field of Classification Search
CPC ..... B32B 27/26; B32B 37/06; B32B 2255/10; B32B 2262/00; B32B 2262/0276; B32B 2264/102; B32B 2307/304; B32B 2309/02; B32B 2309/105; C01B 33/18
USPC ........ 2/456; 428/402; 442/59, 117, 152, 164
See application file for complete search history.

(56) References Cited

U.S. PATENT DOCUMENTS

| | | | |
|---|---|---|---|
| 2007/0036983 A1* | 2/2007 | Takeda | B32B 27/12 428/423.1 |
| 2007/0141940 A1* | 6/2007 | Baychar | A41D 31/02 442/328 |
| 2008/0131648 A1* | 6/2008 | Baychar | B32B 3/26 428/90 |
| 2013/0071640 A1* | 3/2013 | Szillat | E04B 1/7604 428/215 |
| 2014/0356574 A1* | 12/2014 | Conolly | B32B 15/04 428/138 |
| 2015/0056438 A1 | 2/2015 | Lim et al. | |
| 2015/0140888 A1* | 5/2015 | Lee | B32B 5/022 442/370 |
| 2015/0174434 A1* | 6/2015 | Condon | A62B 17/006 2/457 |
| 2015/0259493 A1* | 9/2015 | Nederkoorn | C08J 9/0061 521/97 |
| 2016/0089334 A1* | 3/2016 | Nakayama | C09D 11/00 424/489 |

FOREIGN PATENT DOCUMENTS

| | | |
|---|---|---|
| JP | 2001303341 | 10/2001 |
| KR | 19900004241 | 6/1990 |
| KR | 200405219 | 1/2006 |
| KR | 1020110061279 | 6/2011 |
| KR | 102014133222 | 11/2014 |
| KR | 1020140133222 | 11/2014 |
| KR | 1020150021896 | 3/2015 |

* cited by examiner

FUNCTIONAL FABRIC AND MANUFACTURING METHOD THEREFOR

TECHNICAL FIELD

The present invention disclosed herein relates to a functional fabric, and more particularly, to an insulation flexible sheet having insulation property, a functional fabric including the same and a manufacturing method therefor.

BACKGROUND ART

Research on imparting natural fibers or synthetic fibers with various functions is conducted in various industries, and recently, clothing fabrics which serve heating or insulation effects are more interested along with the increase of recognition on energy savings and abnormal temperature phenomenon.

Examples may include heating underclothes on the market, which are clothes made using heating fibers and are classified into two main types. One of them is a moisture-absorption heating product which uses a principle of warming a body by generating moisture-absorption heat by fibers themselves via moisture produced from human skin, and the other one is a photo-heating product which generates heat by absorbing light.

However, fabrics made using such heating fibers may not unconditionally show the functionalities thereof but may heat when satisfying the conditions as follows. Moisture-absorption heating products have defects of exhibiting their own function only if physical activities are active to sweat, and most of the photo-heating products have defects of exhibiting their own function only when exposed to strong light for a long time.

As another example, Korean Registration Patent No. 10-1145208 discloses a use of an insulation fiber fabric using fibers having a hollow structure forming an insulation air space or a radial extended groove shape structure for achieving human thermoregulation function in the manufacture of clothes which have antibiotic action and are capable of human thermoregulation.

As described above, hollow fibers in which vacant spaces are formed in the fibers to endow insulation effects are present, but according to the types, the hollow shapes may be lost during processing. In addition, the fibers are thick when compared to the conventional fibers, and the thickness control is limited considering insulation effects.

DISCLOSURE OF THE INVENTION

Technical Problem

An object of the present invention is to provide a functional fabric having effective insulation performance with a small amount used by using silica particles having pores, and having excellent strength due to the strength of the silica particles.

In addition, another object of the present invention is to manufacture an insulation flexible sheet and a functional fabric, of which particles are not cleaved or lost and which has excellent strength and flexibility by forming an insulation coating layer by curing an insulating resin composition in which a soft resin and the above-mentioned silica particles are mixed.

In addition, further another object is to provide an insulation flexible sheet and a functional fabric, which are capable of having another functions in addition to insulation performance by adding a functional coating layer.

In addition, further another object is to manufacture a flexible sheet and a functional fabric, which may maintain flexibility, and durability and insulation after washing by further laminating one base layer having excellent flexibility on an insulation coating layer.

Technical Solution

The present invention has been made to accomplish the above-described objects of the present invention, and the present invention provides a functional fabric including a base fabric layer; and an insulation flexible sheet attached to at least one surface of the base fabric layer.

Also, the base fabric layer may be a fabric manufactured using one or more selected from the group consisting of natural fibers, synthetic fibers, artificial fibers, regenerated fibers, and functional fibers, or a mixture thereof.

In addition, the insulation flexible sheet may include a first flexible base; and an insulation coating layer attached to at least one surface of the base, and a second flexible base attached onto the insulation coating layer may be further included.

Meanwhile, the functional fabric may further include a functional coating layer, and the functional coating layer may have UV blocking, IR blocking, light reflection, water repellency, and water permeable and water-proof functions.

In addition, the first flexible base or the second flexible base may be one selected from polyurethane-based (PU), thermoplastic polyurethane (TPU), polylactic acid (PLA), and polyvinyl chloride (PVC) films.

The insulation coating layer may be formed using an insulating resin composition including a soft resin and silica particles as major components, and the insulating resin composition may further include an adhesive or attaching agent, a form resin, a diluting solvent.

In addition, the diluting solvent may be prepared using one or more selected from methyl ethyl ketone (MEK), ethyl acetate (EA), toluene and xylene, or a mixture thereof.

Also, the soft resin may be manufactured using one or more selected from a polyurethane-based resin, a polylactic acid (PLA) resin, a polyvinyl chloride (PVC) resin, and a soft form resin, or a mixture thereof.

The silica particles in the insulation coating layer may preferably have a filling rate of 1-80%, and the silica particle may be one or more types selected from hollow silica particles, porous silica particles, and porous hollow silica particles, or a mixture thereof.

Also, the silica particles may preferably have a size of 10 nm-10 μm.

Another aspect of the present invention is to provide an insulation flexible sheet including a first flexible base; and an insulation coating layer attached to at least one surface of the base, and a second flexible base attached onto the insulation coating layer may be further included.

Meanwhile, the insulation flexible sheet may further include a functional coating layer, and the functional coating layer may have UV blocking, IR blocking, light reflection, water repellency, and water permeable and water-proof functions.

Further, the insulation flexible sheet may preferably have a thickness of 0.1-1,000 μm.

In addition, the insulation flexible sheet may have a thermal conductivity of 0.1 W/m·K or less and may maintain durability and flexibility after washing, and insulation properties.

Another aspect of the present invention is to provide a method of manufacturing an insulation flexible sheet including (a) a step of preparing a first flexible base; (b) a step of preparing an insulating resin composition including a soft resin and silica particles as major components; (c) a step of applying the insulating resin composition on the first flexible base; and (d) a step of curing the applied insulating coating composition to form an insulation coating layer.

In step (b), the soft resin may be prepared using one or more selected from a polyurethane-based resin, a polylactic acid (PLA) resin, a polyvinyl chloride (PVC) resin, and a soft form resin, or a mixture thereof, and a filling rate of the silica particles in the insulating resin composition may preferably be 1-80%.

In addition, the insulating resin composition may further include an adhesive (attaching) agent and a diluting solvent in step (b), and the diluting solvent may be prepared using one or more selected from methyl ethyl ketone (MEK), ethyl acetate (EA), and toluene, or a mixture thereof.

Also, a step of applying a functional composition to form a functional coating layer may be further included in steps after step (b).

Meanwhile, a step of laminating a second flexible base on the applied composition of step (c) may be further included, and the curing of step (d) may be thermal curing performed at 15-200° C. In addition, the initial temperature capable of curing in the heat curing temperature range may be a temperature range commonly referred to as room temperature.

Another aspect of the present invention is to provide a method of manufacturing an insulation flexible sheet including (a) a step of preparing a first flexible base; (b) a step of preparing an insulating resin composition including a soft resin and silica particles as major components; (c) a step of applying the insulating resin composition on the first flexible base; (d) a step of laminating a second flexible base which is the same as or different from the first flexible base on the applied insulating resin composition in a sandwich type; and (e) a step of curing the applied insulating coating composition to form an insulation coating layer between the first and second flexible bases.

Further, the insulating resin composition may further include an adhesive (attaching) agent and a diluting solvent in step (b), and a step of applying a functional composition to form a functional coating layer may be further included in steps after step (b).

Another aspect of the present invention is to provide a method for manufacturing a functional fabric including (a) a step of preparing a base fabric layer; (b) a step of laminating the insulation flexible sheet of the present invention; and (c) a step of thermal bonding of the base fabric layer and the insulation flexible sheet.

In addition, a temperature of thermal bonding in step (c) may preferably be 50-200° C. Also, the base fabric layer and the insulation flexible sheet may be physically attached at room temperature in step (c).

Advantageous Effects

The functional fabric according to the present invention may have effective insulation performance with a small amount used by using silica particles having pores and have excellent strength due to the strength of the silica particles.

In addition, an insulation flexible sheet and a functional fabric may be manufactured into a small thickness by using silica particles having minute sizes, and since the particle size and the concentration and the amount used of a composition including particles could be controlled according to the performance required, the thickness may be easily controlled.

Since an insulation coating layer is formed by curing an insulating resin composition in which a soft resin and the above-mentioned silica particles are mixed, an insulation flexible sheet and a functional fabric, in which particles are not cleaved or lost and which has excellent strength and flexibility, may be manufactured.

In addition, the insulation flexible sheet and the functional fabric may have another function in addition to insulation performance by additionally including a functional coating layer, and may maintain flexibility, and durability and insulation properties after washing by laminating one more base having excellent flexibility on the insulation coating layer.

MODE FOR CARRYING OUT THE INVENTION

The objects, features and advantages will become more apparent via detailed description below with reference to the accompanying drawings, and accordingly, a person skilled in the art would easily conduct the technical idea of the present invention. In addition, in explaining the present invention, if particular explanation on relevant prior art to the present invention might unnecessarily is considered to obscure the gist of the present invention, detailed explanation thereof will be omitted. Hereinafter, preferred embodiments according to the present invention will be explained in detail with reference to accompanying drawings.

I. FUNCTIONAL FABRIC

Figure 1:
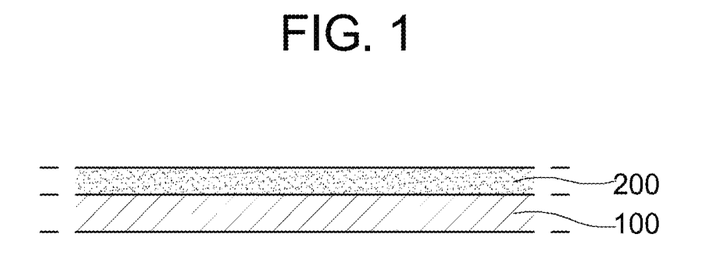
FIG. 1 is a cross-sectional view of a functional fabric.
Figure 4:
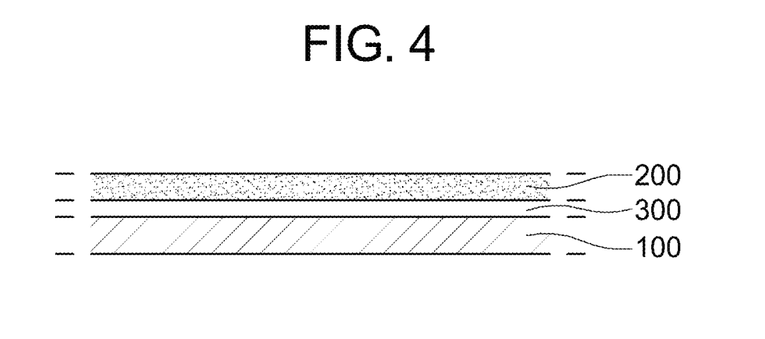
FIG. 4 is a cross-sectional view of a functional fabric with an additional functional coating layer.

FIG. 1 is a cross-sectional view of a functional fabric consisting of a base fabric layer 100 and an insulation flexible sheet 200 attached on the surface of the base fabric layer 100, and FIG. 4 is a cross-sectional view of a functional fabric additionally including a functional coating layer 300 between a base fabric layer 100 and an insulation flexible sheet 200.

The functional fabric may be used in products such as warm clothes, warm covers, non-woven fabrics, and wrapping papers and the functional fabric may be used in the whole or part of the product. In addition, the base fabric layer 100 consisting of the functional fabric may be a fabric manufactured using one or more selected from the group consisting of natural fibers, synthetic fibers, artificial fibers, regenerated fibers and functional fibers, or a mixture thereof. The synthetic fibers may include polyester (PET)-based fibers and nylon, and the natural fibers may include cotton.

The functional fabric of the present invention may additionally include a functional coating layer 300. The position of the functional coating layer 300 may be both sides of the base fabric layer 100 in the functional fabric, both sides of the insulation flexible sheet 200, or the inner part of the insulation flexible sheet 200, and the number of the functional coating layer 300 is not limited to one. According to the position of the functional coating layer 300, performance of UV blocking, IR blocking, light reflection, water repellency, and water permeable and water-proof may be given.

In addition, the functional fabric of the present invention has advantages of maintaining durability, flexibility, insulation properties and other functionalities after washing.

II. INSULATION FLEXIBLE SHEET

Figure 2:
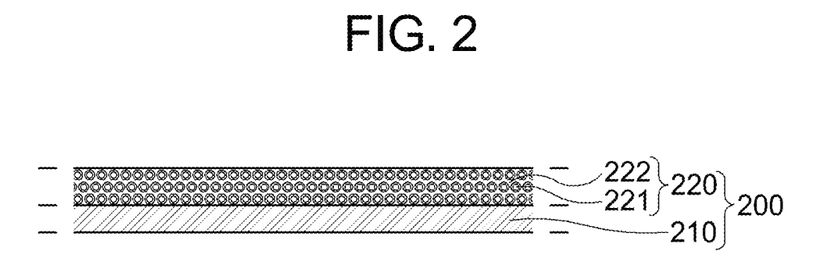
FIG. 2 is a cross-sectional view of an insulation flexible sheet.
Figure 3:
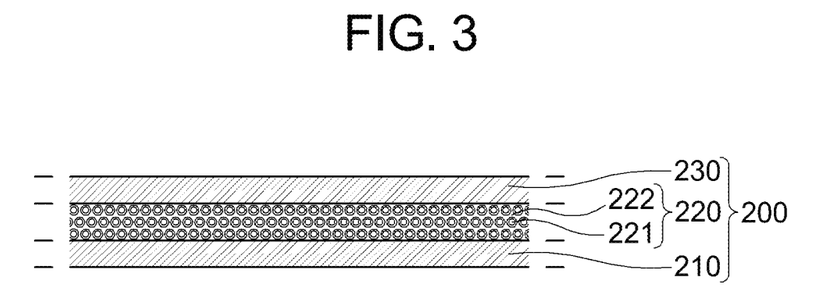
FIG. 3 is a cross-sectional view of an insulation flexible sheet of a sandwich type.

FIG. 2 and FIG. 3 illustrate the cross-sectional views of the insulation flexible sheets 200, and particularly, FIG. 2 illustrates the cross-sectional view of an insulation flexible sheet including a first flexible base 210 and an insulation coating layer 220 including silica particles 221 and a soft resin 222 as major components attached thereon, and FIG. 3 illustrates the cross-sectional view of an insulation flexible sheet of a sandwich type, in which a second flexible base 230 is additionally attached onto the insulation coating layer 220 of FIG. 2.

As shown in FIG. 2 and FIG. 3, the insulation flexible sheet 200 of the present invention includes a first flexible base 210 and an insulation coating layer 220 attached to at least one surface of the base. In addition, the insulation flexible sheet 200 may additionally include a second flexible base 230 attached onto the insulation coating layer 220 to be manufactured into an insulation flexible sheet with a sandwich type, and the structure is not limited thereto but may be modified.

The first flexible base 210 and the second flexible base 230 may be selected from polyurethane-based (PU), thermoplastic polyurethane (TPU), polylactic acid (PLA), and polyvinyl chloride (PVC) films, without limitation. The polyurethane-based (PU) film has the merit of having better flexibility than other films. Particularly, the thermoplastic polyurethane (TPU) film has water permeable and water-proof functions and thus is water-proof while not holding moisture, and may be used in industrial fields which deal with water. In addition, this film is not wet with water of high thermal conductivity, and is good in preserving insulation performance. The polylactic acid (PLA) film and the polyvinyl chloride (PVC) film are also flexible and have a low thermal conductivity of less than 0.2 W/m·K, and thus have merits of giving insulation performance.

Meanwhile, the insulation coating layer 220 in the insulation flexible sheet 200 may be formed using an insulating resin composition including a soft resin 222 and silica particles 221 as major components. In addition, the soft resin 222 may be manufactured by one or more selected from a polyurethane-based resin, a polylactic acid (PLA) resin, a polyvinyl chloride (PVC) resin, and a soft form resin, or a mixture thereof. Since the soft resin 222 is flexible after curing irrespective of the amount used, no deformation of a base to which the soft resin is applied arises, and the type of the base or the amount used of the resin may not be specifically limited. In addition, by using a soft resin such as a polylactic acid (PLA) resin and a polyvinyl chloride (PVC) resin with a thermal conductivity of less than 0.2 W/m·K, insulation performance may be given.

The filling rate of the silica particles 221 in the insulation coating layer 220 may preferably be 1-80%. If the filling rate is less than 1%, insulation performance may not be sufficiently achieved, and if the filling rate is greater than 80%, the resin content is small, and curing efficiency may be degraded.

In addition, the silica particles 221 are characterized in one or more selected from hollow silica particles, porous silica particles, and porous hollow silica particles, or a mixture thereof. Silica is a material with bad thermal conductivity, and thus has low thermal conductivity and excellent insulation effects. The silica particles have merits of having high strength and excellent dispersibility.

Also, the hollow or porous type of the silica particles 221 is excellent in giving insulation effects in view of blocking heat transference, because air could not circulate through pores. In addition, the hollow silica particles may be prepared by a method not requiring a template in addition to the conventional method using a precursor, and the method does not require a firing process which requires a great deal of time and high energy cost, and has the merit of producing hollow silica particles via a simple preparation process.

Figure 6:
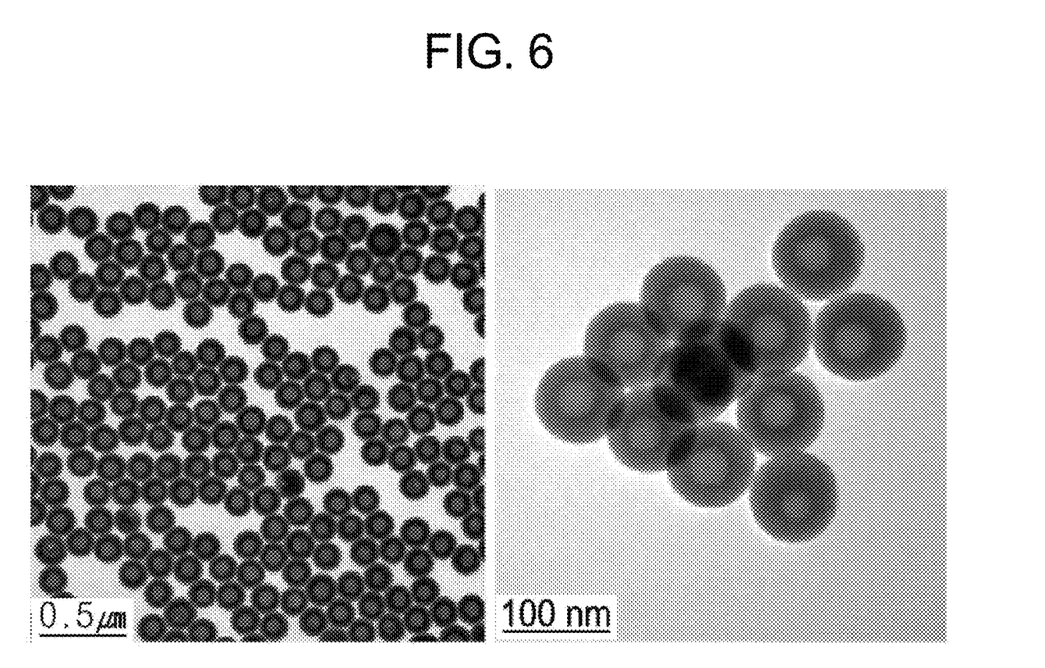
FIG. 6 illustrates photographic images of transmission electron microscope (TEM) of hollow silica particles having an average diameter of 100 nm among silica particles.

FIG. 6 illustrates photographic images of transmission electron microscope (TEM) of hollow silica particles having an average diameter of 100 nm among the silica particles 221, and the silica particles 221 preferably have a size of 10 nm to 10 μm. If the size of the particles is less than 10 nm, the size of the cavity or pore in the silica particles 221 may be insufficiently secured, thereby decreasing the porosity. On the contrary, if the size of the silica particles 221 is greater than 10 μm, complete filling in the coating layer during forming the insulation coating layer 220 may become impossible, and the filling ratio of particles may decrease, and accordingly, targeted insulation effect may not be achieved.

The insulating resin composition may additionally include an adhesive or attaching agent, a form resin, and a diluting solvent, and the diluting solvent may be prepared using one or more selected from methyl ethyl ketone (MEK), ethyl acetate (EA), toluene, and xylene, or a mixture thereof. The viscosity of the diluting solvent may be controlled according to the amount of the silica particles 221. In addition, additives for giving additional functions may be further included, if needed.

Meanwhile, the insulation flexible sheet 200 may additionally include a functional coating layer 300. The functional coating layer 300 may be positioned in any place including the both sides or the inner portion of the insulation flexible sheet 200, without limitation. In addition, the functional coating layer 300 may give performance such as UV blocking, IR blocking, light reflection, water repellency, water permeable and water-proof performance according to the position thereof.

III. PHYSICAL PROPERTIES OF INSULATION FLEXIBLE SHEET

Further, the insulation flexible sheet 200 may have a different thickness according to the size of the silica particles 221 and may preferably have a thickness of 0.1-1,000 μm. If the thickness is less than 0.1 μm, the filling rate of the silica particles 221 or the amount of other constituent elements in a composition forming the insulation coating layer 220 is insufficient, and necessary functions may be degraded. If the thickness deviates from 1,000 μm, the handling and processability may be deteriorated. By having a thin thickness of 0.1-1,000 μm as described above, a thickness difference between the functional fabric thus manufactured and the original thickness of the base fabric layer 100 is small, and the tactile impression of the fabric itself may remain as it stands during manufacturing the functional fabric. In addition, since the insulation flexible sheet is light and flexible, the processing thereof is easy, and the application thereof is diverse.

In addition, the insulation flexible sheet 200 may preferably have a thermal conductivity of 0.1 W/m·K or less. If the thermal conductivity is greater than 0.1 W/m·K, expected insulation effects may be insufficiently shown.

If such insulation flexible sheet 200 is applied as the constituent element of the fabric, the merits of maintaining durability, flexibility, insulation properties and other functionalities after washing may be achieved.

IV. MANUFACTURING METHOD OF INSULATION FLEXIBLE SHEET

Figure 5:
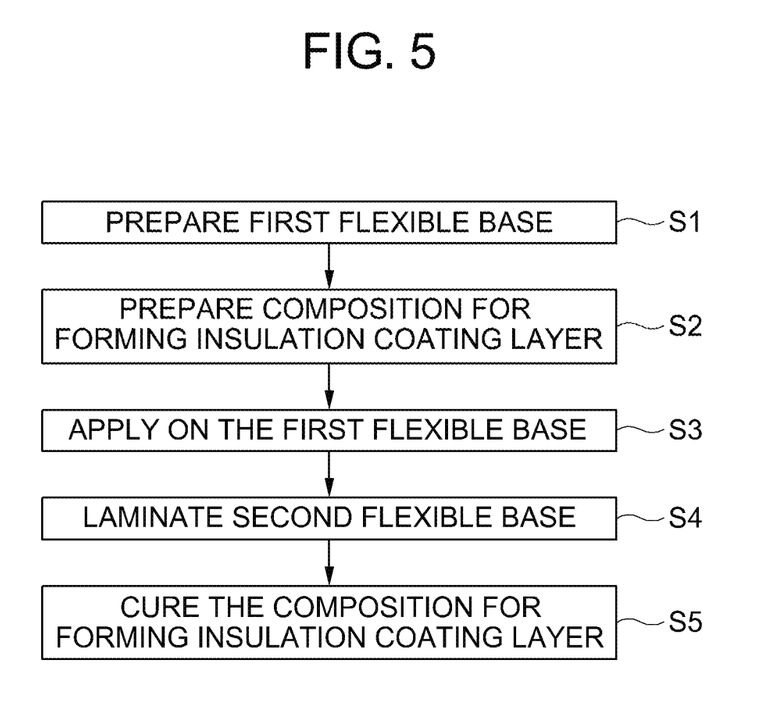
FIG. 5 is a flowchart showing a manufacturing method of an insulation flexible sheet of a sandwich type.

FIG. 5 is a flowchart showing the manufacturing method of an insulation flexible sheet 200 with a sandwich type among the manufacturing methods of an insulation flexible sheet 200.

Not limited to the manufacturing method shown in FIG. 5, the present invention provides a method of manufacturing an insulation flexible sheet 200 including (a) a step of preparing a first flexible base 210; (b) a step of preparing an insulating resin composition including a soft resin 222 and silica particles 221 as major components; (c) a step of applying the insulating resin composition on the first flexible base 210; and (d) a step of curing the applied insulating coating composition to form an insulation coating layer 220.

The first flexible base 210, the second flexible base 230 and the soft resin 222 used in step (a) and step (b) may impart the insulation flexible sheet 200 with flexibility, the secured flexibility may be maintained due to the excellent dispersibility of the silica particles 221, and insulation properties may be given due to the pores in the silica particles 221.

In addition, the insulating resin composition may further include an adhesive (attaching) agent and a diluting solvent in step (b). In this case, the viscosity may be controlled via the diluting solvent according to the amount of the silica particles 221. The diluting solvent may be prepared using one or more selected from methyl ethyl ketone (MEK), ethyl acetate (EA), toluene, and xylene, or a mixture thereof.

Also, a step of forming a functional coating layer 300 by applying a functional composition may be further included in steps after step (b). The functional composition may impart the insulation flexible sheet 200 with UV blocking, IR blocking, light reflection, water repellency, or water permeable and water-proof performance in addition to insulation properties.

Meanwhile, the insulation flexible sheet 200 may be manufactured by further including a step of laminating a second flexible base 230 on the composition applied in step (c). By manufacturing the insulation flexible sheet 200 with a sandwich type by positioning the insulation coating layer 220 between the first flexible base 210 and the second flexible base 230, there is no concern on the loss of the silica particles 221 in the insulation coating layer 220, and the stability of the composition may be even further improved. In addition, the curing of step (d) may preferably be performed at 15-200° C. The initial temperature capable of curing in the heat curing temperature range may be a temperature range commonly referred to as room temperature.

Figure 7:
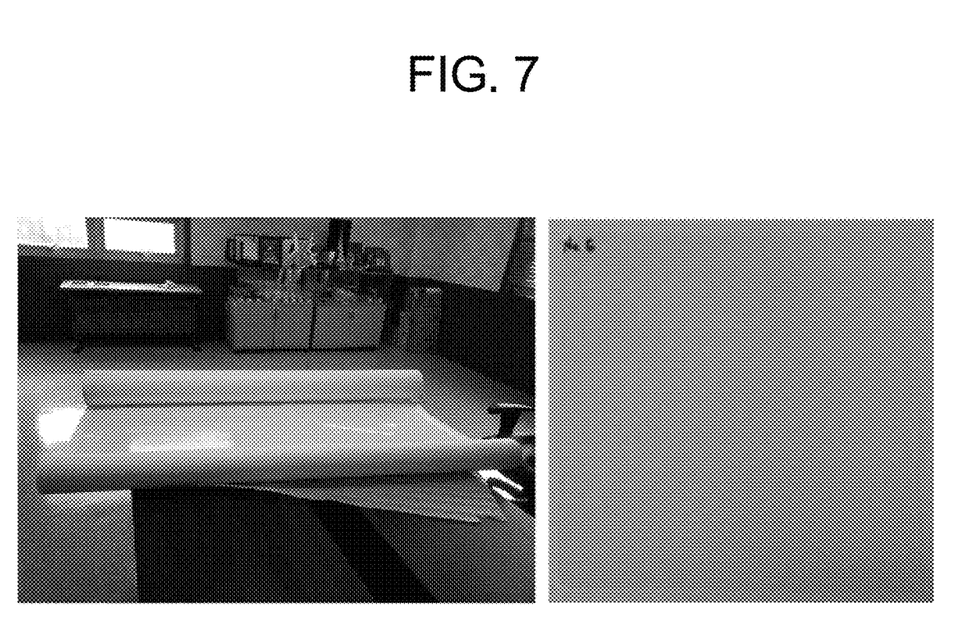
FIG. 7 illustrates photographic images of an insulation coating layer formed on a paper base and an insulation coating layer separated from the paper base.

Meanwhile, FIG. 7 illustrates a photographic image of an insulation coating layer 220 formed using an insulating resin composition including a soft resin 222 and hollow silica particles as major components on a paper base, and a photographic image of an insulation coating layer separated from the paper base.

As shown in FIG. 7, the insulation coating layer 220 may be independently manufactured by applying an insulating resin composition including the soft resin 222 and the silica particles 222 as major components on a base such as a paper and a PET film, and curing. The insulation flexible sheet 200 may be manufactured by separating the insulation coating layer 220 thus manufactured from the base, and then physically attaching thereof on the first soft base 210. Such independent insulation coating layer 220 has the merit of being used by changing the base for attachment according to the use.

V. MANUFACTURING METHOD OF FUNCTIONAL FABRIC

Meanwhile, the present invention provides a method of manufacturing a functional fabric characterized in including (a) a step of preparing a base fabric layer 100; (b) a step of laminating an insulation flexible sheet 200; and (c) a step of thermal bonding of the base fabric layer 100 and the insulation flexible sheet 200.

The temperature of the thermal bonding in step (c) may preferably be 50-200° C. More preferably, the thermal bonding is performed at 100° C. or less, and generally, the thermal bonding is performed at a temperature around 70° C. During the thermal bonding, solvents may be evaporated, and pores for water permeable and insulation functions may be formed inside. On the contrary, the base fabric layer 100 and the insulation flexible sheet 200 may be physically bonded at room temperature in step (c), and a binder such as an acryl binder and a polyurethane binder may be used.

VI. EXAMPLES

Example 1: Manufacture of Insulation Flexible Sheet

A PU film with a thickness of 40 μm was prepared as a first flexible base. Then, a thermosetting resin with the solid content of 18% (DHC-18D, DNF Co., Ltd.) was prepared (used up to 97 wt %) and added with hollow silica particles having a size of 1 μm in a filling ratio of 3 wt % based on the thermosetting resin, and xylene was added as a diluting solvent to prepare an insulating resin composition. The insulating resin composition thus prepared was applied on a TPU film, and heat cured at 140° C. to form an insulation coating layer to manufacture an insulation flexible sheet.

Example 2

An insulation flexible sheet was manufactured by the same method as Example 1 except for changing the filling rate of the hollow silica particles having a size of 1 μm to 20 wt % in Example 1.

Example 3

A PU film with a thickness of 20 μm was prepared as a first flexible base. Then, an insulation flexible sheet was manufactured by the same method as Example 1 except for using hollow silica particles having a size of 300 nm in Example 1.

Example 4

An insulation flexible sheet was manufactured by the same method as Example 3 except for changing the filling rate of the hollow silica particles having a size of 300 nm to 20 wt % in Example 3.

Comparative Examples 1-2: Flexible Base without Applying Insulating Resin Composition Without applying an insulating resin composition, PU films having thicknesses of 20 μm and 40 μm were respectively prepared as first flexible bases.

Example 5: Manufacture of Insulation Flexible Sheet with Sandwich Type

A PU film with a thickness of 40 μm was prepared as a first flexible base. Then, a thermosetting resin with the solid content of 18% (DHC-18D, DNF Co., Ltd.) was prepared (used up to 97 wt %) and added with hollow silica particles having a size of 1 μm in a filling ratio of 3 wt % based on the thermosetting resin, and xylene was added as a diluting solvent to prepare an insulating resin composition. The insulating resin composition thus prepared was applied on a TPU film, and a TPU film as the first flexible base was laminated as a second flexible base. Then, heat curing was performed at 140° C. to form an insulation coating layer between the two TPU films to manufacture an insulation flexible sheet of a sandwich type.

Example 6: Manufacture of Functional Fabric

A polyester texture was prepared as a base fabric, and a polyurethane binder (SB-300, Samjung Coater Liquid Co. Ltd., 10% of the fabric) was applied on a base fabric layer. Then, the insulation flexible sheet manufactured in Example 1 was laminated and thermal bonded at 70° C. to manufacture a functional fabric.

Example 7: Manufacture of Functional Fabric Including Insulation Flexible Sheet with a Sandwich Type A polyester texture was prepared as a base fabric, and a polyurethane binder (SB-300, Samjung Coater Liquid Co. Ltd., 10% of the fabric) was applied on a base fabric layer. Then, the insulation flexible sheet with a sandwich type manufactured in Example 2 was laminated and thermal bonded at 70° C. to manufacture a functional fabric.

Comparative Example 3: Base Fabric Layer without Laminating Insulation Flexible Sheet A polyester texture was prepared as a base fabric layer without laminating an insulation flexible sheet.

VII. EVALUATION OF INSULATION FLEXIBLE SHEET

Physical properties were evaluated by the methods described below and are listed in Table 1. The insulation flexible sheets obtained in Examples 1-4 and the PU films obtained in Comparative Examples 1-2 are expressed by "experimental samples". In addition, hollow silica particles are expressed by HS and listed in Table 1.

1. Measurement of Thermal Conductivity

For the measurement of thermal conductivity, the center portion of the experimental sample with the width of 30 cm, the length of 30 cm, and the thickness of 5 cm was cut out in a square shape with the width of 24 cm and the length of 24 cm to form a frame. On one side of the frame, an aluminum film with the width of 30 cm, and the length of 30 cm was attached to form a concave portion, which was referred to as a specimen stub. In addition, the side covered with the aluminum film was considered as a bottom surface of the specimen stub, and the other side with respect to the thickness direction of the experimental sample was considered as a ceiling surface. An insulating material of a particulate phase was filled in the concave portion without tapping or pressurizing, and leveling was performed, and then, an aluminum film with the width of 30 cm, and the length of 30 cm was put on the ceiling surface to obtain a measurement specimen. By using the measurement specimen, thermal conductivity at 30° C. was measured using a heat flow meter HFM 436 Lambda (trade name, manufactured by NETZCH Co.) Correction was conducted in advance according to JISA1412-2, using a NIST SRM 1450c standard board for correction with a density of 163.12 $kg/m^2$ and a thickness of 25.32 mm, under temperature difference conditions between a high temperature side and a low temperature side of 20° C., at 15, 20, 24, 30, 40, 50, 60 and 65° C. Thermal conductivity at 800° C. was measured based on a method of JIS A 1421-1. Two experimental samples having a disc shape with a diameter of 30 cm and a thickness of 20 mm were considered as measurement specimens, and a guarded hot plate method measurement apparatus (manufactured by Eicoseiki Co., Ltd.) was used as a measurement apparatus.

2. Measurement of Thickness

The thickness was measured using a digital dial gauge (DG-205, manufactured by Peacock Co.) as a thickness measurement apparatus.

3. Measurement of Sewn Part Strength

An experimental sample of 20×100 mm was manufactured, a paper was spread thereunder, and sewn holes with a pitch=5 mm were punched using an industrial sewing machine. Then, the paper was removed, and tensile test of pulling in the directions of arrows X and Y as shown in the drawing was performed with a test speed=300 mm/min to measure sewn part strength (N/cm). Evaluation was conducted based on the criterion below and was shown by the score.

≪Criterion≫

5 points: sewn part strength=40 (N/cm) or more, or breaking was generated in other parts of the sewn part. The strength was 40 (N/cm) or more and very excellent.

4 points: sewn part strength=20 (N/cm) to less than 40 (N/cm) and good.

3 points: sewn part strength=10 (N/cm) to less than 20 (N/cm) and easy to generate defects.

2 points: sewn part strength=10 (N/cm) to less than 15 (N/cm) and problems are shown a little.

1 point: sewn part strength=less than 10 (N/cm) and bad.

4. Measurement of Flexibility

An experimental sample of 10 m×100 mm was manufactured and the experimental sample was extruded by a length of 5 cm from a stud for fixing. Sagging degree of the extrusion of the experimental sample which was a test specimen was measured, and the flexibility was evaluated based on the criterion below and was shown by the score.

《Criterion》

5 points: "sagging" of the experimental sample was 2 cm or more and excellent.

4 points: "sagging" of the experimental sample was 1 cm to less than 2 cm and good.

3 points: "sagging" of the experimental sample was 0.4 cm to less than 1 cm and easy to generate defects.

2 points: "sagging" of the experimental sample was less than 0.4 cm and bad.

TABLE 1

|  | Thermal conductivity (W/m·K) | Thickness (μm) | Sewn part strength (point) | Flexibility (point) | Note |
| --- | --- | --- | --- | --- | --- |
| Example 1 | 0.079 | 40 | 5 | 5 | Add 3 wt % of HS (1 μm particles) |
| Example 2 | 0.039 | 40 | 5 | 5 | Add 20 wt % of HS (1 μm particles) |
| Comparative Example 1 | 0.584 | 40 | 3 | 5 | PU Film itself |
| Example 3 | 0.069 | 20 | 5 | 5 | Add 3 wt % of HS (300 nm particles) |
| Example 4 | 0.037 | 20 | 5 | 5 | Add 20 wt % of HS (300 nm particles) |
| Comparative Example 2 | 0.369 | 20 | 3 | 5 | PU Film itself |
| Example 5 | 0.081 | 80 | 5 | 5 | Add 3 wt % of HS (1 μm particles)/ sandwich type |

When comparing the thermal conductivity of the PU films obtained in Comparative Examples 1-2, the thermal conductivity of the insulation flexible sheets obtained in Examples 1-5 was less than 0.1 W/m·K and was remarkable decreased, and insulation effects were secured. In addition, if the filling rate of the hollow silica particles in the insulation flexible sheet was increased from 3 wt % to 20 wt %, and if the size of the hollow silica particles was further decreased, the thermal conductivity of the insulation flexible sheet was found to be further decreased.

Also, when comparing the thickness results of Comparative Example 1 and Examples 1-2, the thickness changes of the insulation flexible sheets of Examples 1-2 were found not large when compared to the PU film thickness of Comparative Example 1 in view of a μm unit. Accordingly, it was found that although an insulation flexible sheet was manufactured by laminating an insulation coating layer thin, insulation performance may be sufficiently given. In addition, since the thickness difference from an original base is little, and processability and handling were conveniently maintained. In addition, the thickness of the insulation flexible sheet of with sandwich type in Example 5 was also found to be affected only by the thickness of the PU film used as a base.

Meanwhile, the sewn part strength of the insulation flexible sheets obtained in Examples 1-5 was 5 points and was found to be increased when compared to the strength (3 points) of the PU films obtained in Comparative Examples 1-2.

In addition, the flexibility of the insulation flexible sheets obtained in Examples 1-5 was maintained 5 points, which showed excellent flexibility, when compared to the flexibility of the PU films obtained in Comparative Examples 1-2.

VIII. EVALUATION OF FUNCTIONAL FABRIC

In order to secure the thermokeeping properties of the functional fabric manufactured in Example 6 and the functional fabric including an insulation flexible sheet of a sandwich type, manufactured in Example 7, experiments were performed as follows.

Measurement of Thermokeeping Properties

Infrared fiber thermography was measured using an infrared thermography apparatus under conditions of room temperature of 25° C. and humidity of 28%, and thermokeeping properties were measured three times or more and an average was obtained. The results are as follows.

Temperature increasing effect of 3-5° C. on average were obtained for the functional fabric including the insulation flexible sheet manufactured in Example 6 and the functional fabric including the insulation flexible sheet with a sandwich type manufactured in Example 7 when compared to the polyester texture on which an insulation flexible sheet was not laminated and obtained in Comparative Example 3.

It is understood that the above-described present invention should not be limited to exemplary embodiments and attached drawings but various substitutions, changes and modifications can be made by one ordinary skilled in the art within the technical spirit of the present invention.

The invention claimed is:

1. A functional fabric comprising a base fabric layer; and an insulation flexible sheet attached to at least one surface of the base fabric layer,
   wherein the insulation flexible sheet comprises a first flexible base which is one selected from polyurethane-based (PU), thermoplastic polyurethane (TPU) and polylactic acid (PLA) films; a flexible insulation coating layer attached to at least one surface of the base; and a second flexible base attached onto the flexible insulation coating layer such that the flexible insulation coating layer is between the first flexible base and the second flexible base, wherein the second flexible base is one selected from polyurethane-based (PU), thermoplastic polyurethane (TPU) and polylactic acid (PLA) films,
   wherein the flexible insulation coating layer is formed using an insulating resin composition comprising a soft resin, which is manufactured using one or more selected from a polyurethane-based resin, a polylactic acid (PLA) resin, or a mixture thereof; and hollow silica particles,
   wherein a filling rate of the hollow silica particles in the flexible insulation coating layer is 1-80%, and the hollow silica particles have a size of 10 nm to 10 μm, wherein a thickness of the insulation flexible sheet is 0.1-1,000 μm and the insulation flexible sheet has a thermal conductivity of 0.1 W/m·K or less.

2. The functional fabric of claim 1, wherein the base fabric layer is a fabric manufactured using one or more selected from the group consisting of natural fibers, synthetic fibers, artificial fibers, regenerated fibers, and functional fibers, or a mixture thereof.

3. The functional fabric of claim 1, wherein the functional fabric further comprises a functional coating layer.

4. A method of manufacturing the functional fabric according to claim 1, the method comprising:
   (a) a step of preparing the first flexible base;
   (b) a step of preparing the insulating resin composition comprising the soft resin and hollow silica particles as major components;
   (c) a step of applying the insulating resin composition on the first flexible base; and
   (d) a step of curing the applied insulating coating composition to form the insulation coating layer.

5. The method of claim 4, wherein the insulating resin composition further comprises an adhesive (attaching) agent and a diluting solvent in step (b).

6. The method of claim 4, further comprising a step of applying a functional composition to form a functional coating layer in steps after step (b).

7. The method of claim 4, further comprising a step of laminating the second flexible base on the applied composition of step (c).

8. The method of claim 4, wherein curing of step (d) is performed at 15-200° C.

9. A method of manufacturing the functional fabric according to claim 1, the method comprising:
   (a) a step of preparing the first flexible base;
   (b) a step of preparing the insulating resin composition comprising the soft resin and hollow silica particles as major components;
   (c) a step of applying the insulating resin composition on the first flexible base;
   (d) a step of laminating the second flexible base which is the same as or different from the first flexible base on the applied insulating resin composition in a sandwich type; and
   (e) a step of curing the applied insulating coating composition to form the insulation coating layer between the first and second flexible bases.

10. The method of claim 9, wherein the insulating resin composition further comprises an adhesive (attaching) agent and a diluting solvent in step (b).

11. The method of claim 9, further comprising a step of applying a functional composition to form a functional coating layer in steps after step (b).

12. A method for manufacturing a functional fabric according to claim 1, the method comprising:
   (a) a step of preparing the base fabric layer;
   (b) a step of laminating the insulation flexible sheet; and
   (c) a step of thermal bonding of the base fabric layer and the insulation flexible sheet.

13. The functional fabric according to claim 1, wherein the soft resin is manufactured using a polyurethane-based resin.

14. The functional fabric according to claim 1, wherein the soft resin is manufactured using a polylactic acid (PLA) resin.

15. The functional fabric according to claim 14, wherein the soft resin has a thermal conductivity of less than 0.2 W/m·K.

16. The functional fabric according to claim 1, wherein the flexible insulation coating layer is formed by curing the soft resin.

17. The functional fabric according to claim 1, wherein the flexible insulation coating layer is manufactured by applying the insulating on a base and curing; and separating the flexible insulation coating layer thus manufactured from the base.

* * * * *